US007889742B2

(12) United States Patent
Rezaiifar et al.

(10) Patent No.: US 7,889,742 B2
(45) Date of Patent: Feb. 15, 2011

(54) METHOD AND SYSTEM FOR IMPROVING DATA THROUGHPUT

(75) Inventors: Ramin Rezaiifar, San Diego, CA (US); Yongbin Wei, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 875 days.

(21) Appl. No.: 09/967,783

(22) Filed: Sep. 29, 2001

(65) Prior Publication Data

US 2003/0076810 A1 Apr. 24, 2003

(51) Int. Cl.
*H04L 12/28* (2006.01)
*H04L 12/56* (2006.01)

(52) U.S. Cl. ........................ 370/394; 370/335; 370/336

(58) Field of Classification Search ................ 370/349, 370/394, 335, 456, 336, 400, 428, 902; 709/236, 709/249, 250; 714/701, 712, 748
See application file for complete search history.

(56) References Cited

U.S. PATENT DOCUMENTS

| | | | | |
|---|---|---|---|---|
| 4,712,214 | A | 12/1987 | Meltzer et al. | |
| 5,548,593 | A * | 8/1996 | Peschi | 370/394 |
| 5,617,541 | A * | 4/1997 | Albanese et al. | 709/207 |
| 5,648,970 | A * | 7/1997 | Kapoor | 370/394 |
| 5,930,233 | A | 7/1999 | Kanerva et al. | |
| 5,968,197 | A | 10/1999 | Doiron | |
| 6,011,796 | A | 1/2000 | Rezaiifar et al. | |
| 6,126,310 | A | 10/2000 | Osthoff et al. | |
| 6,170,075 | B1 | 1/2001 | Schuster et al. | |
| 6,247,059 | B1 | 6/2001 | Johnson et al. | |
| 6,370,153 | B1 * | 4/2002 | Eng | 370/438 |
| 6,434,147 | B1 * | 8/2002 | Brown et al. | 370/394 |
| 6,594,791 | B2 | 7/2003 | Sipola | |
| 6,606,306 | B1 * | 8/2003 | Lin et al. | 370/261 |
| 6,618,375 | B2 * | 9/2003 | Rezaiifar et al. | 370/394 |
| 6,804,220 | B2 | 10/2004 | Odenwalder et al. | |
| 6,832,261 | B1 * | 12/2004 | Westbrook et al. | 709/236 |
| 6,876,657 | B1 * | 4/2005 | Brewer et al. | 370/394 |
| 6,895,011 | B1 * | 5/2005 | Lassers | 370/394 |
| 6,928,473 | B1 * | 8/2005 | Sundaram et al. | 709/224 |
| 6,934,264 | B2 | 8/2005 | Jou | |
| 6,961,340 | B2 | 11/2005 | Karlsson et al. | |

(Continued)

FOREIGN PATENT DOCUMENTS

CN 1214828 4/1999

(Continued)

OTHER PUBLICATIONS

U.S. Appl. No. 60/322,698, filed Sep. 17, 2001.*

(Continued)

*Primary Examiner*—Ayaz R Sheikh
*Assistant Examiner*—Chuong T Ho
(74) *Attorney, Agent, or Firm*—D. Scott Juneau

(57) ABSTRACT

A method and system provides for efficient data throughput by efficiently re-sequencing received data packets at a remote station. The method and system assigns identification information to each received packet, and then re-sequences the received packets by putting the identification information in order. The disclosed method and system allows partial re-sequencing and partial transmission of received data packets, thereby reducing data transmission delay.

9 Claims, 5 Drawing Sheets

U.S. PATENT DOCUMENTS

| | | | | |
|---|---|---|---|---|
| 6,963,582 | B1 * | 11/2005 | Xu | 370/466 |
| 6,999,729 | B2 | 2/2006 | Wandel | |
| 7,009,976 | B1 * | 3/2006 | Michelson et al. | 370/394 |
| 7,065,068 | B2 | 6/2006 | Ghosh et al. | |
| 7,065,213 | B2 * | 6/2006 | Pinder | 380/240 |
| 7,079,505 | B2 * | 7/2006 | Okunishi et al. | 370/321 |
| 7,092,393 | B1 * | 8/2006 | Westbrook et al. | 370/394 |
| 7,113,523 | B1 * | 9/2006 | Kubota et al. | 370/535 |
| 7,215,679 | B2 * | 5/2007 | Pugel | 370/412 |
| 2001/0056560 | A1 | 12/2001 | Khan et al. | |
| 2002/0064167 | A1 * | 5/2002 | Khan et al. | 370/410 |
| 2003/0021248 | A1 * | 1/2003 | Proctor et al. | 370/335 |
| 2003/0054807 | A1 * | 3/2003 | Hsu et al. | 455/414 |
| 2003/0066004 | A1 | 4/2003 | Rudrapatna et al. | |
| 2003/0076810 | A1 | 4/2003 | Rezaiifar et al. | |
| 2006/0209783 | A1 * | 9/2006 | Jain et al. | 370/349 |
| 2008/0187136 | A1 * | 8/2008 | Zhang et al. | 380/270 |

FOREIGN PATENT DOCUMENTS

| | | |
|---|---|---|
| EP | 0633678 | 1/1995 |
| EP | 1137226 | 9/2001 |
| EP | 1137226 A2 * | 9/2001 |
| EP | 1195938 | 4/2002 |
| JP | 07-123079 | 5/1995 |
| JP | 1146187 | 2/1999 |
| WO | 9813940 | 4/1998 |
| WO | 0147124 | 6/2001 |

OTHER PUBLICATIONS

Siemens AG, "In-Sequence delivery for an Async/Sync HARQ scheme," 3GPP TSG-RAN WG2 Meeting #23 R2-011878, Jul. 31, 2001, Internet Search Date: Jan. 25, 2008,URL: http://www.3gpp.org/ftp/tsg_ran/WG2_RL2/TSGR2_23/Docs/Zips/R2-011878.zip.

International Search Report—PCT/US2002/030385, International Search Authority—European Patent Office—Mar. 3, 2003.

International Preliminary Examination Report—PCT/US2002/030385, International Search Authority—IPEA/US—Alexandria,Virginia—Apr. 20, 2004.

3rd Generation Partnership Project; Technical Specification Group Radio Access Network; High Speed Downlink Packet Access; Overall UTRAN Description (Release 5), Technical Report, 3GPP TR 25.855 v5.0.0 (Sep. 2001), 26 pages, 3GPP Organizational Partners.

Benelli, G., et al., "A Coding and Retransmission Protocol for Mobile Radio Data Transmission, "IEEE Vehicular Technology Conference, Netherlands, 1999, pp. 2505-2509.

Branecci, M., et al., "Ambiguity Analysis for Hybrid Type II ARQ/FEC Protocol on a Fluctuating Radio Channel," IEEE International Conference on Montreal, France, 1997, pp. 1068-1072, 1997.

Gong, F., et al., "An Application-Oriented Error Control Scheme for High-Speed Networks," IEEE/ACM Trans. On Networking, 4(5):669-682, 1996.

"HARQ Protocol: Details of Asynchronous/Synchronous HARQ Scheme, Discussion and decision, Agenda Item 9.2.2, Source: Motorola", 3GPP TSG-RAN WG2, TSGR2#23-011977, Aug. 27-31, 2001, Helsinki, Finland.

Lucent Technologies, TSG-RAN#17(00)1382: "Asynchronous and Adaptive Incremental Incremental Redundancy for HSDPA",TSG-RAN#17(00)1382, Nov. 25, 2000, pp. 1-5.

Philip S. Yu, et al., "An Efficient Selective-Repeat ARQ Scheme for Satellite Channels and Its Throughput Analysis," IEEE Transactions on Communications, New York, vol. COM-29, No. 3, 1981, 353-363.

* cited by examiner

SUBPACKETS THAT BELONG TO THE SAME PACKET

| ORIGINAL SEQUENCE NUMBERS | 0 | 1 | 2 | 3 | 4 | 5 | 2 | 3 | 6 | 7 | 2 | |
|---|---|---|---|---|---|---|---|---|---|---|---|---|
| SUBPACKETS (SPs) | A01 | A11 | ~~A21~~ | ~~A31~~ | A01 | A11 | ~~A22~~ | A32 | ~~A01~~ | A11 | A23 | ... |
| PACKET IDs (PIDs) | 7 | 8 | | | 11 | 12 | | 10 | | 14 | 9 | |

304

302

306

AFTER RECEPTION OF A01, THE RECEIVER STARTS POPULATING THE TABLE FOR ACIDS 2 AND 3 THAT ARE MISSING.

AFTER RECEPTION OF A11, THE RECEIVER STARTS POPULATING THE TABLE FOR ACIDS 2 AND 3 THAT ARE MISSING.

THE TABLE FOR THIS ACID IS NOT NULL. SO, GET THE SUBPACKET ID FOR THIS ACID FROM THE TABLE.

THE TABLE FOR THIS ACID IS NOT NULL. SO, GET THE SUBPACKET ID FOR THIS ACID FROM THE TABLE.

*FIG. 3*

METHOD AND SYSTEM FOR IMPROVING DATA THROUGHPUT

BACKGROUND

1. Field

The present invention relates to data communication. More particularly, the present invention relates to improving data throughput of a wireless communication system by re-sequencing data packets.

2. Background

The field of wireless communications has many applications including, e.g., wireless telephones, paging, wireless local loops, personal digital assistants (PDAs), Internet telephony, and satellite communication systems. A particularly important application is cellular telephone systems for mobile subscribers. (As used herein, the term “cellular” systems encompass both cellular and personal communications services (PCS) frequencies.) Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). In particular, IS-95 and its derivatives, IS-95A, IS-95B, ANSI J-STD-008 (often referred to collectively herein as IS-95), and high-data-rate (HDR) systems for data, etc. are promulgated by the Telecommunication Industry Association (TIA), the International Telecommunications Union (ITU), and other well known standards bodies.

Cellular telephone systems configured in accordance with the use of the IS-95 standard employ CDMA signal processing techniques to provide highly efficient and robust cellular telephone service. An exemplary described system utilizing CDMA techniques is the cdma2000. The standard for cdma2000 is given in IS-2000 and has been approved by the TIA. The cdma2000 standard is compatible with IS95 systems in many ways. Another CDMA standard is the W-CDMA standard, as embodied in 3rd Generation Partnership Project “3GPP.” Another CDMA standard is Interim Standard IS-856, which is commonly referred to as a HDR system.

Transmission of digital data is inherently prone to interference, which may introduce errors into the transmitted data. Error detection schemes have been suggested to determine as reliably as possible whether errors have been introduced into the transmitted data. For example, it is common to transmit data in packets and add to each packet a cyclic redundancy check (CRC) field, for example of a length of sixteen bits, which carries a checksum of the data of the packet. When a receiver receives the data, the receiver calculates the same checksum on the received data and verifies whether the result of the calculation is identical to the checksum in the CRC field.

When the transmitted data is not used in a delay sensitive application, it is possible to request retransmission of erroneous data when errors are detected. However, when the transmission is used in a delay sensitive application, such as, e.g., in telephone lines, cellular phones, remote video systems, etc., it may not be possible to request retransmission.

Convolutional codes have been introduced to allow receivers of digital data to correctly determine the transmitted data even when errors may have occurred during transmission. The convolutional codes introduce redundancy into the transmitted data and pack the transmitted data into packets in which the value of each bit is dependent on earlier bits in the sequence. Thus, when errors occur, the receiver can still deduce the original data by tracing back possible sequences in the received data.

To further improve the performance of a transmission channel, interleavers are used to re-order bits in the packet during coding. Thus, when interference destroys some adjacent bits during transmission, the effect of the interference is spread out over the entire original packet and can more readily be overcome by the decoding process. Other improvements may include multiple-component codes that encode the packet more than once, in parallel or in series, or a combination thereof. For example, it is known in the art to employ an error correction method that uses at least two convolutional coders in parallel. Such parallel encoding is commonly referred to as turbo coding.

For multiple-component codes, optimal decoding is often a very complex task, and may require large periods of time not usually available for on-line decoding. Iterative decoding techniques have been developed to overcome this problem. Rather than determining immediately whether received bits are zero or one, the receiver assigns each bit a value on a multilevel scale representative of the probability that the bit is one. Data represented on the multilevel scale is referred to as “soft data,” and iterative decoding is usually soft-in/soft-out, i.e., the decoding process receives a sequence of inputs corresponding to probabilities for the bit values and provides as output corrected probabilities, taking into account constraints of the code. Generally, a decoder that performs iterative decoding uses soft data from former iterations to decode the soft data read by the receiver. During iterative decoding of multiple-component codes, the decoder uses results from the decoding of one code to improve the decoding of the second code. When parallel encoders are used, as in turbo coding, two corresponding decoders may conveniently be used in parallel for this purpose. Such iterative decoding is carried out for a plurality of iterations until it is believed that the soft data closely represents the transmitted data. Those bits that have a probability indicating that they are closer to one binary are assigned binary zero, and the remaining bits are assigned binary one.

Turbo coding represents an important advancement in the area of forward error correction (FEC). There are many variants of turbo coding, but most types of turbo coding use multiple encoding steps separated by interleaving steps combined with the use of iterative decoding. This combination provides previously unavailable performance with respect to noise tolerance in a communications system. Namely, turbo coding allows communications at levels of energy-per-bit per noise power spectral density (Eb/No) that were previously unacceptable using the existing forward error correction techniques.

Many communications systems use forward error correction techniques and therefore would benefit from the use of turbo coding. For example, turbo codes could improve the performance of wireless satellite links, in which the limited downlink transmit power of the satellite necessitates receiver systems that can operate at low Eb/No levels.

In some exemplary CDMA systems, such as HDR systems, the data may be transmitted in packets. Packets carrying data traffic may be transmitted in sub-packets. Due to interference in data transmission, the remote station may not successfully decode the encoded data that is transmitted in the first sub-packet. Therefore, data sub-packets are redundantly transmitted until the mobile decodes the data packet. Redundant sub-packets are then soft-combined at the receiver. Redundancy refers to the substantially similar information carried by each sub-packet. Redundant representations may be generated either through repetition or through additional coding. The process of soft combining allows the recovery of corrupted bits. Through the process of soft combining, wherein one corrupted sub-packet is combined with another corrupted sub-packet, the transmission of repetitious and redundant sub-packets can allow a system to transmit data at a guaranteed minimum transmission rate.

Transmissions of the sub-packets to the remote station may be in a staggered pattern so that transmission gaps occur between the redundant sub-packets. The delay between sub-packets provides an opportunity for the target remote station to process decoding the sub-packet before the arrival of the next sub-packet of the same packet. If the remote station is able to successfully decode the sub-packet before the arrival of the next sub-packet and to verify the CRC bits of the decoded result before the arrival of the next sub-packet, the remote station may transmit an acknowledgment (ACK) signal to the base station. If the base station could demodulate and interpret the ACK signal sufficiently in advance of the next scheduled redundant sub-packet transmission, the base station need not send any redundant sub-packet. The base station may then transmit a new data packet to the same remote station or to another remote station during the slot period that had been designated for the cancelled redundant sub-packets.

Base stations transmit the sub-packets in a predetermined sequence. However, the packets successfully decoded at a target remote station would not be in the same sequence. Therefore, the target remote station has to re-sequence sequence the decoded packets before sending them to higher layers, without unnecessary delays.

There is, therefore, a need in the art for providing for enhanced data throughput by efficiently re-sequencing and transmitting data.

SUMMARY

Embodiments disclosed herein address the above-stated needs by providing a method and system for efficiently re-sequencing data packets. In one aspect, a method for re-sequencing data packets includes the steps of receiving a plurality of sub-packet, where the plurality of sub-packets may be in a sequence different from an original sequence, and assigning identification information or a tag to each of the sub-packets. The method then re-sequences the received packets to the original sequence according to the assigned identification information or tags.

In another aspect, a computer readable media embodies a method for re-sequencing data packets, as described above.

In another aspect, an apparatus for re-sequencing data packets includes a memory unit and a digital signal processing (DSP) communicatively coupled to the memory unit. The DSP is capable of carrying out the step of the above-described method.

BRIEF DESCRIPTION OF THE DRAWINGS

FIG. 3 is an exemplary set of sub-packets transmitted by the base station;

DETAILED DESCRIPTION

Figure 1:
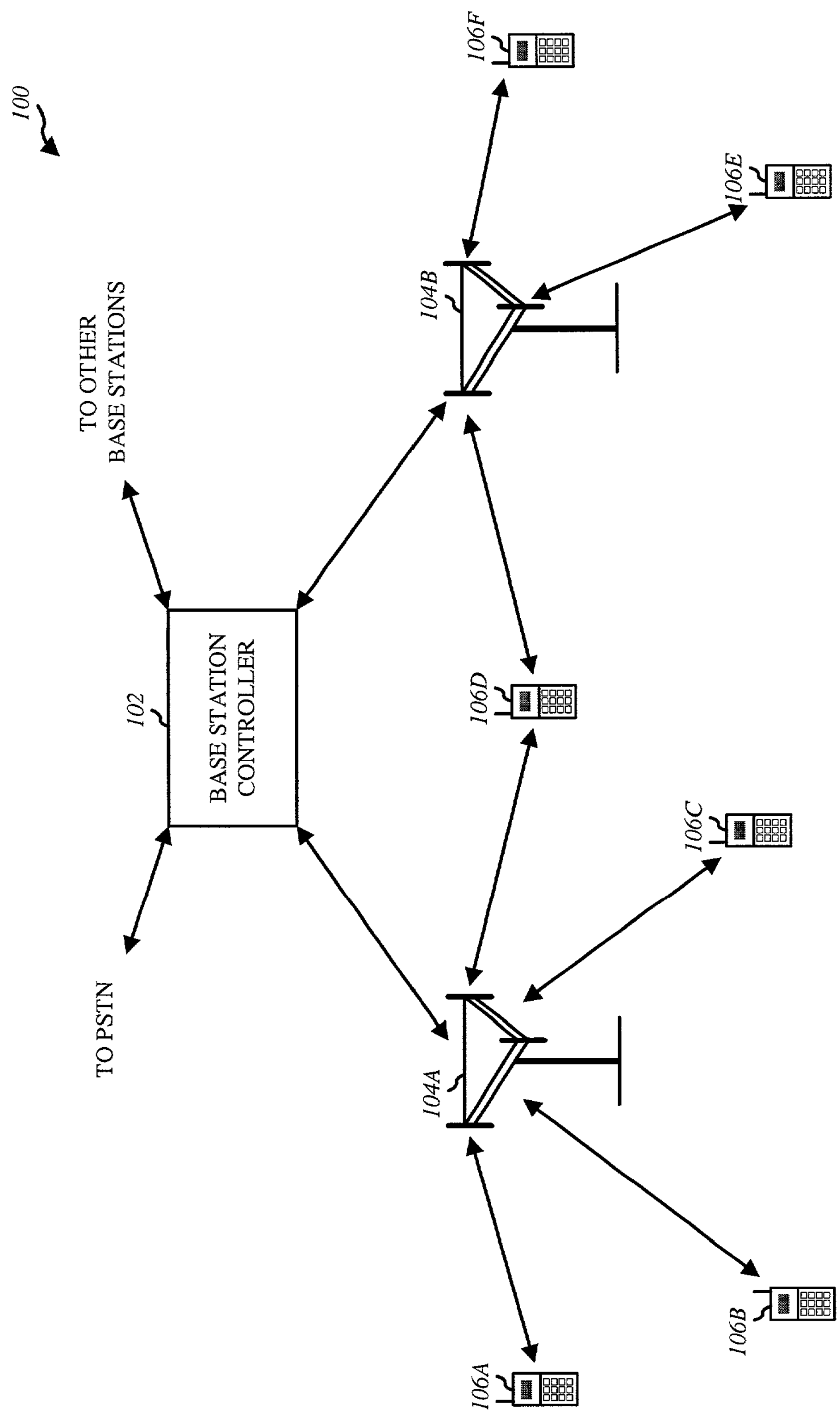
FIG. 1 is a block diagram of an exemplary voice and data communication system.

FIG. 1 is a diagram of a wireless communication system 100 that supports a number of users and is capable of implementing various aspects of the invention. System 100 provides communication for a number of cells, with each cell being serviced by a corresponding base station 104. The base stations are also commonly referred to as base transceiver systems (BTSs). Various remote stations 106 are dispersed throughout the system. Each remote station 106 may communicate with one or more base stations 104 on the forward and reverse links at any particular moment, depending on whether or not the remote station is active and whether or not it is in soft handoff. The forward link refers to transmission from base station 104 to remote station 106, and the reverse link refers to transmission from remote station 106 to base station 104. As shown in FIG. 1, base station **104*a* communicates with remote stations 106*a*, 106*b*, 106*c*, and 106*d*, and base station 104*b* communicates with remote stations 106*d*, 106*e*, and 106*f*. Remote station 106*d* is in soft handoff and concurrently communicates with base stations 104*a* and 104*b***.

In system 100, a base station controller (BSC) 102 couples to base stations 104 and may further couple to a public switched telephone network (PSTN). The coupling to the PSTN may be achieved via a mobile switching center (MSC), which is not shown in FIG. 1 for simplicity. A BSC may also couple into a packet network, which is typically achieved via a packet data serving node (PDSN) that is also not shown in FIG. 1. BSC 102 provides coordination and control for the base stations coupled to it. BSC 102 further controls the routing of telephone calls among remote stations 106, and between remote stations 106 and users coupled to the PSTN (e.g., conventional telephones) and to the packet network, via base stations 104.

System 100 may be designed to support one or more CDMA wireless standards. Such standards may include the CDMA standards such as (1) the "TIA/EIA-95-B Remote station-Base Station Compatibility Standard for Dual-Mode Wideband Spread Spectrum Cellular System" (the IS95 standard); (2) the "TIA/EIA-98-D Recommended Minimum Standard for Dual-Mode Wideband Spread Spectrum Cellular Remote station" (the IS-98 standard); (3) the documents offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard); and (4) the documents offered by a consortium named "3rd Generation Partnership Project 2" (3GPP2) and embodied in a set of documents including Document Nos. C.S0002-A, C.S0005-A, C.S0010-A, C.S0011-A, C.S0024, and C.S0026 (the cdma2000 standard). In the case of the 3GPP and 3GPP2 documents, these are converted by standards bodies world-wide (e.g., TIA, ETSI, ARIB, TTA, and CWTS) into regional standards and have been converted into international standards by the International Telecommunications Union (ITU). These standards are incorporated herein by reference.

Figure 2:
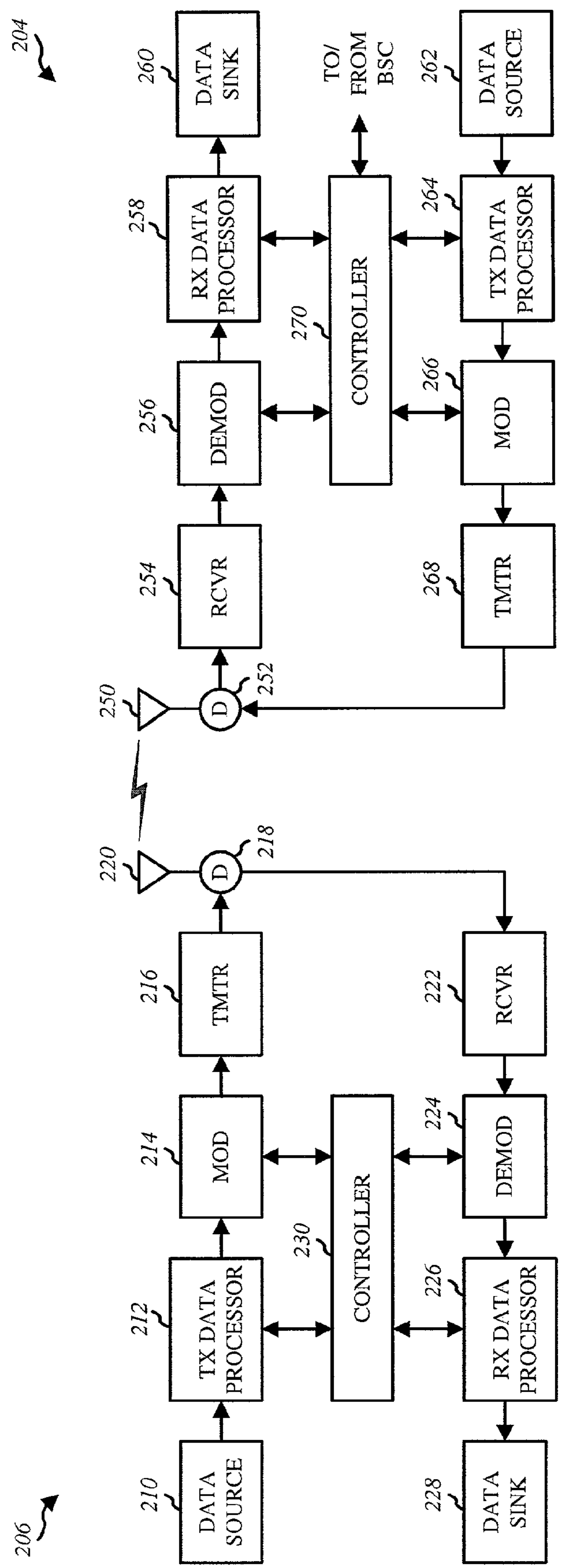
FIG. 2 is a block diagram of an exemplary embodiment for the remote station and the base station operating in FIG. 1.

FIG. 2 is a simplified block diagram of an embodiment of base station 204 and remote station 206, which are capable of implementing various aspects of the invention. For a particular communication, voice data, packet data, and/or messages may be exchanged between base station 204 and remote station 206, via an air interface 208. Various types of messages may be transmitted, such as messages used to establish a communication session between the base station and remote station and messages used to control a data transmission (e.g., power control, data rate information, acknowledgment, and so on). Some of these message types are described in further detail below. For the reverse link, at remote station 206, voice and/or packet data (e.g., from a data source 210) and messages (e.g., from a controller 230) are provided to a transmit (TX) data processor 212, which formats and encodes the data and messages with one or more coding schemes to generate coded data. Each coding scheme may include any combination of cyclic redundancy check (CRC), convolutional, turbo, block, and other coding, or no coding at all. The voice data, packet data, and messages may be coded using different schemes, and different types of messages may be coded differently.

The coded data is then provided to a modulator (MOD) 214 and further processed (e.g., covered, spread with short PN sequences, and scrambled with a long PN sequence assigned to the user terminal). The modulated data is then provided to a transmitter unit (TMTR) 216 and conditioned (e.g., converted to one or more analog signals, amplified, filtered, and quadrature modulated) to generate a reverse link signal. The reverse link signal is routed through a duplexer (D) 218 and transmitted via an antenna 220 to base station 204.

At base station 204, the reverse link signal is received by an antenna 250, routed through a duplexer 252, and provided to a receiver unit (RCVR) 254. Receiver unit 254 conditions (e.g., filters, amplifies, down converts, and digitizes) the received signal and provides samples. A demodulator (DEMOD) 256 receives and processes (e.g., despreads, decovers, and pilot demodulates) the samples to provide recovered symbols. Demodulator 256 may implement a rake receiver that processes multiple instances of the received signal and generates combined symbols. A receive (RX) data processor 258 then decodes the symbols to recover the data and messages transmitted on the reverse link. The recovered voice/packet data is provided to a data sink 260 and the recovered messages may be provided to a controller 270. The processing by demodulator 256 and RX data processor 258 are complementary to that performed at remote station 206. Demodulator 256 and RX data processor 258 may further be operated to process multiple transmissions received via multiple channels, e.g., a reverse fundamental channel (R-FCH) and a reverse supplemental channel (R-SCH). Also, transmissions may be simultaneously from multiple remote stations, each of which may be transmitting on a reverse fundamental channel, a reverse supplemental channel, or both.

On the forward link, at base station 204, voice and/or packet data (e.g., from a data source 262) and messages (e.g., from controller 270) are processed (e.g., formatted and encoded) by a transmit (TX) data processor 264, further processed (e.g., covered and spread) by a modulator (MOD) 266, and conditioned (e.g., converted to analog signals, amplified, filtered, and quadrature modulated) by a transmitter unit (TMTR) 268 to generate a forward link signal. The forward link signal is routed through duplexer 252 and transmitted via antenna 250 to remote station 206.

At remote station 206, the forward link signal is received by antenna 220, routed through duplexer 218, and provided to a receiver unit 222. Receiver unit 222 conditions (e.g., down converts, filters, amplifies, quadrature modulates, and digitizes) the received signal and provides samples. The samples are processed (e.g., despreaded, decovered, and pilot demodulated) by a demodulator 224 to provide symbols, and the symbols are further processed (e.g., decoded and checked) by a receive data processor 226 to recover the data and messages transmitted on the forward link. The recovered data is provided to a data sink 228, and the recovered messages may be provided to controller 230.

In some exemplary CDMA systems, packets carrying data traffic are divided into sub-packets, which occupy "slots" of a transmission channel. For illustrative ease only, the nomenclature of a High Data Rate (HDR) system is used herein. Such use is not intended to limit the implementation of the invention to HDR systems. Embodiments can be implemented in other CDMA systems, such as, e.g. cdma2000, without affecting the scope of the embodiments described herein.

In an HDR system, slot sizes have been designated as 1.66 ms, but it should be understood that slot sizes might vary in the embodiments described herein without affecting the scope of the embodiments. For example, the slot size in cdma2000 systems is 1.25 ms in duration. In addition, data traffic can be transmitted in message frames, which can be 5 ms, 10 ms, 20 ms, 40 ms or 80 ms in duration in IS-95 systems. The terms "slots" and "frames" are terms used with respect to different data channels within the same or between different CDMA systems. A CDMA system comprises a multitude of channels on the forward and reverse links, wherein some channels are structured differently from others. Hence, the terminology to describe some channels will differ in accordance with channel. For illustrative purposes only, the term "slots" will be used hereafter to describe the packaging of signals propagated over the air.

Redundant representations of the data payload, or sub-packets, may be packed into time frames or slots, or sub-packets, which may then be soft-combined at the receiver. Redundant representations may be generated either through repetition or through additional coding. The process of soft combining allows the recovery of corrupted bits. Through the process of soft combining, wherein one corrupted sub-packet is combined with another corrupted sub-packet, the transmission of repetitious and redundant sub-packets can allow a system to transmit data at a minimum transmission rate. The transmission of repetitious and redundant sub-packets is especially desirable in the presence of fading.

Rayleigh fading, which is a form of multipath interference, occurs when multiple copies of the same signal arrive at the receiver at different phases, potentially causing destructive interference. Substantial multipath interference with very small delay spread can occur to produce flat fading over the entire signal bandwidth. If the remote station is traveling in a rapidly changing environment, deep fades could occur at times when sub-packets are scheduled for retransmission. When such a circumstance occurs, the base station requires additional transmission power to transmit the sub-packet.

For example, if a scheduler unit within a base station receives a data packet for transmission to a remote station, the data payload is redundantly packed into a plurality of sub-packets, which are sequentially transmitted to a remote station. When transmitting the sub-packets, the scheduler unit may decide to transmit the sub-packets either periodically or in a channel-sensitive manner.

The forward link from the base station to a remote station operating within the range of the base station can comprise a plurality of channels. Some of the channels of the forward link can include, but are not limited to a pilot channel, synchronization channel, paging channel, quick paging channel, broadcast channel, power control channel, assignment channel, control channel, dedicated control channel, medium access control (MAC) channel, fundamental channel, supplemental channel, supplemental code channel, and packet data channel. The reverse link from a remote station to a base station also comprises a plurality of channels. Each channel carries different types of information to the target destination. Typically, voice traffic is carried on fundamental channels, and data traffic is carried on supplemental channels or packet data channels. Supplemental channels are usually dedicated channels, while packet data channels usually carry signals that are designated for different parties in a time-multiplexed manner. Alternatively, packet data channels are also described as shared supplemental channels. For the purposes of describing the embodiments herein, the supplemental channels and the packet data channels are generically referred to as data traffic channels.

Supplemental channels and packet data channels can improve the average transmission rate of the system by allowing the transmission of unexpected data messages to a target station. Since the data payload can be redundantly packed on these channels, a multi-slot transmission scheduled on the forward link may be terminated early if the remote station can determine that the data payload is recoverable from the sub-packets that have already been received. As described above, the data payload that is carried in each slot may undergo various encoding steps wherein the encoded bits are re-ordered into a channel-tolerant format. Hence, in order to accomplish data recovery, the decoder of the remote station must decode the contents of each slot of the multi-slot transmission.

In an HDR system, the rates at which the sub-packets are to be transmitted from a base station to a remote station are determined by a rate control algorithm performed by the remote station and a scheduling algorithm at the base station. This method to modify the data transmission rate is referred to as an automatic repeat request (ARQ) procedure. It should be noted that the system throughput is determined by the rate at which data payload is actually received, which may differ from the bit rate of the transmitted sub-packets. It should also be noted that the invention is not limited to the above implementation. For example, both a rate control algorithm and a scheduling algorithm may be performed at a base station with a channel state feedback from remote stations, without affecting the scope of the embodiments described herein.

The rate control algorithm is implemented by the remote station in order to determine which base station in the active set can provide the best throughput and to determine the maximum data rate at which the remote station can receive packets with sufficient reliability. The active set is the set of base stations that are currently in communication with the remote station. In a typical CDMA or non-CDMA wireless system, a base station transmits a known signal, referred to as a "pilot," at well-defined, periodic intervals. The remote station typically monitors the pilot signal of each base station maintained in the active set, and determines the signal to noise and interference ratio (SINR) of each pilot signal. Based on past SINR information, the remote station predicts a future value of the SINR for each base station, wherein the future value of the SINR will be associated with the next packet duration. The remote station then picks the base station that is likely to have the most favorable SINR over a period of the near future, and estimates the best data rate at which the remote station can receive the next data packet from this base station. The remote station then transmits a data rate control message (DRC) carrying this data rate information to the base station. The best data rate information carried by the DRC may be the data rate at which the remote station requests the next data packet to be transmitted. In an HDR system, the DRC messages are transmitted on a medium access control (MAC) channel of the reverse link waveform.

The scheduling algorithm is implemented at the base station to determine which remote station will be the recipient of the next packet. The scheduling algorithm takes into account the need to maximize base station throughput, the need to maintain fairness between all remote stations operating within the range of the base station, and the need to accommodate the data transmission rates requested by various remote stations. As discussed below, the fast ARQ procedure determines the actual data transmission rate at which each data packet is received, as opposed to the data transmission rate initially determined by the rate control algorithm.

A scheduling unit in the base station monitors the arrival of DRCs from all remote stations that are operating within its range, and uses the DRC information in the scheduling algorithm to determine which remote station will be the next data packet recipient, in accordance with an optimal forward link throughput level. It should be noted that an optimal forward link throughput takes into consideration the maintenance of acceptable link performances for all remote stations operating within the range of the base station. The scheduling unit reassembles the data packet into sub-packets with the appropriate bit rate, and generates a transmission schedule for the sub-packets on designated slots.

As the sub-packets are transmitted, the remote station may determine that the data packet can be successfully decoded from fewer than all the sub-packets scheduled for transmission. Using the fast ARQ procedure, the remote station instructs the base station to stop the transmission of redundant sub-packets, thereby increasing the effective data transmission rate of the system.

It should be noted that the ARQ procedure has the potential to significantly increase the forward link throughput of the underlying wireless communication system. As discussed above, when the remote station transmits a DRC message to the base station, the requested data transmission rate is determined using the rate control algorithm, which uses past SINR values to predict the SINR value of the near future. However, due to fading conditions that arises due to environmental factors and the mobility of the remote station, the prediction of the SINR for the near future is not reliable. In addition, the SINR of the forward link traffic signal may be very different from the SINR of the pilot signal due to interference from adjacent base stations. It is possible that some of the neighboring base stations may have been idle during the sampling period for the SINR prediction calculations. As a result, the remote station may not always predict the SINR with great accuracy. Therefore, the rate control algorithm provides a lower bound estimate for the actual SINR during the next packet duration with high probability, and determines the maximum data transmission rate that can be sustained if the actual SINR is equal to this lower bound estimate. In other words, the rate control algorithm provides a conservative measure of the data transmission rate at which the next packet can be received. The ARQ procedure refines this estimate, based on the quality of the data received during the initial stages of the packet transmission. Hence, it is important for the remote station to inform the base station as soon as the remote station has enough information to decode a data packet, so that early termination of redundant transmissions can occur, which enhances the data transmission rate of the data packet.

Transmissions of the sub-packets to the remote station may be in a staggered pattern so that transmission gaps occur between the sub-packets. In one embodiment, the sub-packets are transmitted periodically at every 4th slot. The delay between sub-packets provides an opportunity for the target remote station to decode the sub-packet before the arrival of the next sub-packet of the same packet. If the remote station is able to decode the sub-packet and to verify the CRC bits of the decoded result before the arrival of the next sub-packet, the remote station may transmit an acknowledgment signal, hereinafter referred to as a FAST_ACK signal, to the base station. If the base station can demodulate and interpret the FAST_ACK signal sufficiently in advance of the next scheduled sub-packet transmission, the base station need not send the scheduled sub-packet transmissions. The base station may then transmit a new data packet to the same remote station or to another remote station during the slot period that had been designated for the cancelled sub-packets. It should be noted that the FAST_ACK signal herein described is separate and distinct from the ACK messages that are exchanged between the higher layer protocols, such as the Radio Link Protocol (RLP) and the Transmission Control Protocol (TCP).

Since the ARQ procedure allows a fast rate adaptation to channel conditions, the ARQ procedure allows for the implementation of a system wherein the initial data transmission may be performed at a high data rate and ramped down as needed. In contrast, a system without ARQ would be forced to operate at a lower data rate, in order to provide a sufficient link budget margin to account for channel variations during packet transmissions.

Base stations may transmit the data packets in a predetermined sequence. However, the packets that are received and successfully decoded at a target remote station may not be in the same sequence. This is because some earlier transmitted packets may be correctly received after some later transmitted ones, as will be described herein. Therefore, the target remote station has to re-sequence the decoded packets before sending them to higher layers, without unnecessarily holding up the data at the remote station.

FIG. 3 shows a scenario for re-sequencing a set of packets that have been received and successfully decoded at the remote station. The base station may transmit a set of sub-packets 302, each having an original packet sequence number 304. However, the original sequence numbers 304 are only known to the base station. FIG. 3 shows the packetIDs (PIDs) 306 that the remote station determines and assigns to the packets, as described below.

In one embodiment, base stations may represent a sub-packet by a pair of indices. For example, "Aij" represents the "jth" sub-packet of the packet "i" that is transmitted to a user "A." The packet "i" may belong to the ARQ channel, which is labeled with the ARQ channel ID (ACID) "i." The sub-packet representation "Aij" may be reused for new packets after the current packet assigned thereto is successfully received and decoded.

As shown in FIG. 3, some sub-packets, e.g., A21, A31, A22, and A01, are not received by the remote station, where the rest of sub-packets are received and assumed to be successfully decoded. When the remote station receives and decodes a packet, the remote station may send an ACK signal to the base station, requesting to stop retransmission of the same packet, otherwise it sends a not acknowledged (NAK) signal. The base station may then start transmitting the first sub-packet of a new packet. For example, after the remote station has informed the base station that it has received sub-packet A01 and A11, the base station may transmit new sub-packets A01 and A11 for new packets.

In one embodiment, if the remote station could not receive a sub-packet and, therefore, could not send NAK or ACK to the base station, the base station considers a NAK is received by default and starts to transmit more sub-packets of the same packet. Similarly, if the remote station could not successfully decode a packet, it sends a NAK signal to the base station, requesting more sub-packets of the same packet. For example, since the remote station had not received sub-packet A21, the base station transmitted sub-packet A22. However, the remote station did not receive sub-packet A22 either; therefore, the base station transmits sub-packet A23, which is eventually received and the corresponding packet is decoded correctly. Consequently, the packets that the remote station receives are not in the same sequence that were transmitted by the base station, and the remote station has to re-synchronize the received packets before transmitting then to higher layers, as described below.

Figure 4:
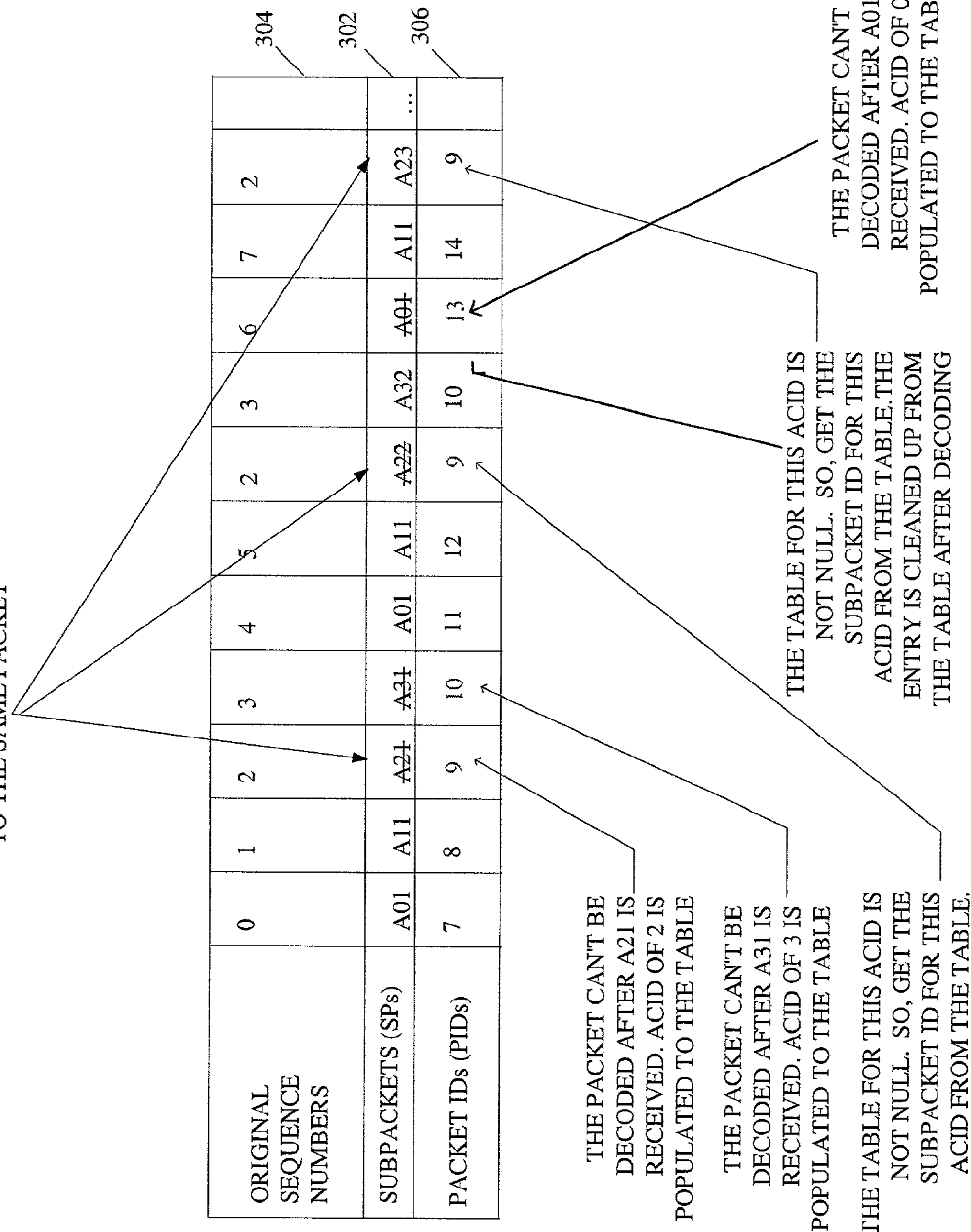
FIG. 4 is another exemplary set of sub-packets transmitted by the base station.

In one embodiment, as shown in FIG. 4, the remote station receives some sub-packets, e.g., A21, A31, A22, and A01, but the corresponding packets can't be decoded correctly based on sub-packets that have been received for the same packet. For example, after the remote station informs the base station that it has received the sub-packet A01 and A11, the base station may transmit new sub-packets A01 and A11 for new packets. After the remote station sends a NAK to the base station and informed the base station that it has received sub-packet A21 but can't decode the associated packet, the base station transmits sub-packet A22. However, the remote station couldn't decode the packet even after it had received sub-packet A22; therefore, the base station transmits sub-packet A23, and the corresponding packet is decoded correctly eventually. Consequently, the packets that the remote station receives are not in the same sequence that were transmitted by the base station, and the remote station has to re-synchronize the received packets before transmitting then to higher layers, as described below.

Figure 5:
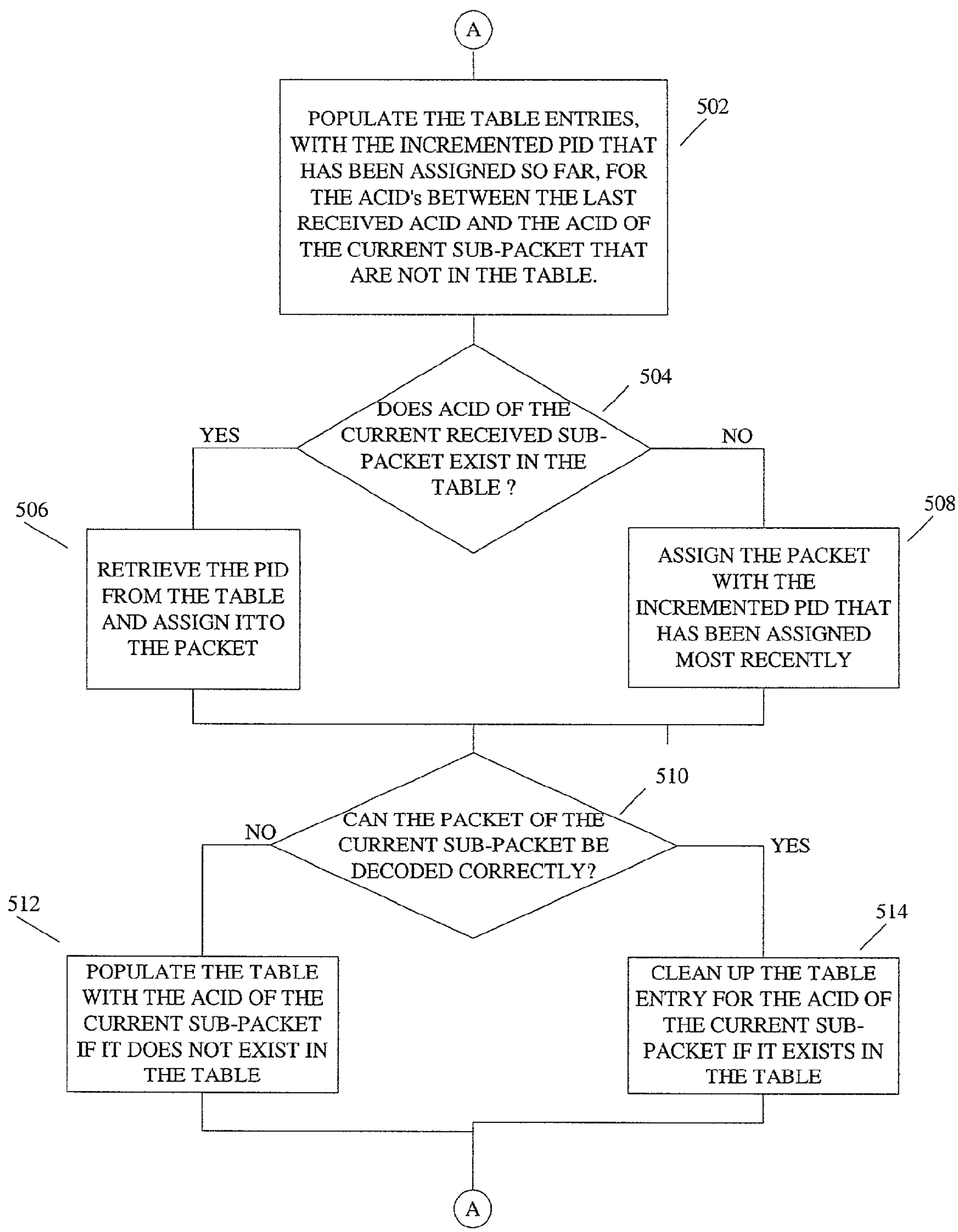
FIG. 5 is a flow chart of an exemplary process for re-sequencing data packets.

According to one embodiment, the remote station re-synchronizes the received packets by assigning to each packet a packet ID (PID), and then reordering the packets based on the assigned PIDs. FIG. 5 shows a flow chart for re-sequencing process of the received packets. When a sub-packet is received, the remote station first determines whether the ACID of the sub-packet is equal to the ACID of the last received sub-packet incremented by one. If the result is negative, the remote station populates 502 a table, which contains the pending PIDs and the associated ACIDs. For each ACID between the last received ACID and the ACID of the current sub-packet, the remote station determines whether such ACID is in the table. If the result is negative, the remote station then populates 502 the table with the ACID and a PID equal to the last assigned PID incremented by one. Then, the remote station determines 504 whether the ACID of the current sub-packet is in the table. If the result is positive, the remote station retrieves the PID associated with the current ACID from the table and establish a correspondence between the PID and the current sub-packet, according to step 506. If the result is negative, the remote station assigns the ACID of the current sub-packet with the last assigned PID incremented by one, according to step 508.

The remote station then determines 510 whether the current packet can be correctly decoded based on all sub-packets that have been received so far for the same packet, including the current sub-packet. If the result is negative, the remote station populates the table with the current ACID and the PID associated with the current sub-packet if the current ACID is not in the table, according to step 512. If the result is positive, the remote station removes 514 the current ACID from the table if the current ACID is in the table.

In one embodiment, the number of missed sub-packets from the last assigned PID may be determined by counting the number of permutations that are required to go from the ACID of the last received sub-packet to the ACID of the current sub-packet. In one embodiment, the ACID of a sub-packet is represented by an index that has four values, e.g. 0, 1, 2, and 3. Thus, going from sub-packet A11, whose ACID is 1, to sub-packet A01, whose ACID is 0, needs 3 permutations, i.e., from 1 to 2, from 2 to 3, and from 3 to 0.

Referring now to FIG. 3, when the remote station receives sub-packet A01, the remote station assigns an arbitrary PID, e.g., 7, to the packet transmitted on ACID of 0. Since the packet is decoded correctly after A01 is received, the corresponding ACID and PID are not populated to the pending table according to step 510 and 514 of FIG. 5. Then, the remote station receives sub-packet A11, immediately following sub-packet A01. Since A11 has an ACID of 1 and there is no gap in going from ACID of 0 to ACID of 1, the remote station assigns PID of 8 to the packet transmitted on ACID of 1.

The remote station does not receive sub-packets A21 and A31, but it receives sub-packet A01. First, the remote station realizes that there is a gap in going from the last received ACID of 1, corresponding to A11, to the current ACID of 0, corresponding to A01, i.e., there are ACIDs of 2 and 3 in between. According to step 502 of FIG. 5, the remote station determines whether ACID of 2 is predetermined and placed in the table. Since the table is not populated yet, the remote station populates the table for ACID of 2 with PID of 9, i.e., the last assigned PID of 8 plus one, according to step 502. Similarly, the remote station populates the table for ACID of 3 and assigns a PID of 10, i.e., 9 plus 1, to the packet transmitting on ACID of 3. Table 1 is now partially populated, as shown below:

| ACID | PID |
|---|---|
| 2 | 9 |
| 3 | 10 |

The remote station then realizes, according to step 504, that the ACID of 0 for the current sub-packet is not in the table, and assigns PID of 11 to the packet of the current sub-packet, according to step 508 in FIG. 5.

When the remote station receives sub-packet A11, the remote station doesn't need to populate the table since there is no gap in going from the last ACID of 0 to the current ACID of 1. The remote station assigns PID of 12 to the packet associated with sub-packet A11.

The remote station has not received sub-packet A22, which is the second transmission of sub-packet A21, but has received sub-packet A32. The remote station realizes that there is a gap in going from the last received ACID of 1 the current ACID of 3, i.e., ACID of 2 is in between. However, ACID of 2 is already in the table. Therefore, the remote station doesn't populate the table with ACID of 2, according to step 502. Since the ACID of 3, corresponding to A32, is already in the table, the remote station retrieves the PID of 10 from the table and assigns it to the current sub-packet, according to step 506 in FIG. 5. Since packet A32 is correctly decoded, the ACID of 3 is removed from the table, according to step 514. Table 1 now looks like this:

| ACID | PID |
|---|---|
| 2 | 9 |

The remote station did not receive sub-packet A01, but it received A11. Therefore, the remote station populates the table with ACID of 0 and PID of 13, which is the last assigned PID of 12 plus one, and assigns PDI of 14 to the packet of the current sub-packet on ACID of 1. Table 1 now looks like this:

| ACID | PID |
|---|---|
| 2 | 9 |
| 0 | 13 |

The remote station then receives sub-packet A23. Since there is no gap in going from the last ACID of 1 to the current ACID of 2, there is no need to populate the table. The remote station realizes that the current of ACID of 2 is in the table and it is associated with PID of 9. The remote station retrieves PID of 9 from the table and assigns it to the packet A23 transmitted on ACID of 2 according to step 506. Since the packet is correctly decoded, the remote station removes the ACID of 2 from the table according to step 514. The table now looks like this:

| ACID | PID |
|---|---|
| 0 | 13 |

After the remote station has assigned PIDs to the received packets, as described above for one exemplary embodiment, the remote station may re-sequence the received packets to their original sequence. For the example shown in FIG. 3, the remote station re-sequences the received packets based on the assigned PIDs, as shown in Table 2:

| True sequence numbers | 0 | 1 | 2 | 3 | 4 | 5 | 7 | |
|---|---|---|---|---|---|---|---|---|
| PIDs | 7 | 8 | 9 | 10 | 11 | 12 | 14 | . . . |

It should be noticed that none of the sub-packets for the packet with PID of 13 has been received yet, therefore this packet does not appear in Table 2. As discussed above, the remote station has assigned PID of 13 to this packet, as shown in the last version of Table 1. When a sub-packet for this packet is received and successfully decoded, the remote station will assign PID 13 to it.

The example in FIG. 4 can be similarly explained. The difference is that all sub-packets are received but some of the packets can't be decoded after receiving some of their sub-packets. Therefore, in this example, the table is not populated in step 502 of FIG. 5. Instead, it is populated according to step 512 in FIG. 5. The other operations are similar to the example in FIG. 3 as described in above.

In one embodiment, the remote station may re-sequence a part of the packets, and may transmit the re-sequenced part to the higher level, for enhanced data throughput. For example, the remote station may transmit packets with PIDs of 7 and 8, respectively, without waiting for the rest of packets to be received. However, the remote station has to wait until it receives the packet having PID 9 before being able to transmit the next group of packets having PIDs 9, 10, 11, and 12, respectively.

The word "exemplary" is used exclusively herein to mean "serving as an example, instance, or illustration." Any embodiment described herein as "exemplary" is not necessarily to be construed as preferred or advantageous over other embodiments.

An HDR subscriber station, referred to herein as an access terminal (AT), may be mobile or stationary, and may communicate with one or more HDR base stations, referred to herein as modem pool transceivers (MPTs). An access terminal transmits and receives data packets through one or more modem pool transceivers to an HDR base station controller, referred to herein as a modem pool controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for re-sequencing data packets in a wireless communication system, comprising:

receiving a plurality of sub-packets at a wireless communication device, the plurality of sub-packets being in a sequence different from an original sequence;

assigning channel identifier information to each of the plurality of sub-packets as received;

assigning packet identification information to each of the plurality of sub-packets as received;

re-sequencing the data packets as received to the original sequence according to the assigned packet identification information;

determining whether any of the plurality of sub-packets has associated packet identification information stored in a table using the channel identifier information, wherein the re-sequencing improves data throughput of the wireless communication device;

determining whether a received sub-packet of the plurality of sub-packets can be correctly de-coded;

if the received sub-packet can be correctly decoded, determining whether such sub-packet has a predetermined packet identification information;

if the received sub-packet cannot be correctly decoded and such sub-packet has no predetermined packet identification information, determining packet identification information for such sub-packet.

2. The method of claim 1, wherein the assigning includes assigning the predetermined packet identification information to a sub-packet that has predetermined packet identification information.

3. The method of claim 1, wherein the assigning includes:

incrementing the last assigned packet identification information; and assigning the incremented packet identification information to a sub-packet that has no predetermined packet identification information.

4. The method of claim 1, further including:

if such sub-packet has a predetermined packet identification information, deleting the predetermined packet identification information for such sub-packet.

5. The method of claim 1, wherein the re-sequencing includes re-sequencing a part of the data packets.

6. The method of claim 1, further including: if the received sub-packet cannot be correctly decoded and such sub-packet has no predetermined packet identification information, determining packet identification information for such sub-packet.

7. A non-transitory computer-readable medium encoded with a computer program, the computer program executed by a computer, the computer program product for re-sequencing data packets in a wireless communication system, comprising:

code for causing a computer to receive a plurality of sub-packets at a wireless communication device, the plurality of sub-packets being in a sequence different from an original sequence;

code for causing a computer to assign channel identifier information to each of the plurality of sub-packets as received;

code for causing a computer to assign packet identification information to each of the plurality of sub-packets as received;

code for causing a computer to re-sequence the data packets as received to the original sequence according to the assigned packet identification information; and code for causing a computer to determine whether any of the plurality of sub-packets has associated packet identification information stored in a table using the channel identifier information, wherein the re-sequencing of the data packets improves data throughput of the wireless communication device;

code for causing a computer to determine whether a received sub-packet of the plurality of sub-packets can be correctly de-coded;

if the received sub-packet can be correctly decoded, determining whether such sub-packet has a predetermined packet identification information;

if the received sub-packet cannot be correctly decoded and such sub-packet has no predetermined packet identification information, determining packet identification information for such sub-packet.

8. An apparatus for re-sequencing data packets in a wireless communication system, comprising:

means for receiving a plurality of sub-packets at a wireless communication device, the plurality of sub-packets being in a sequence different from an original sequence;

means for assigning channel identifier information to each of the plurality of sub-packets as received;

means for assigning packet identification information to each of the plurality of sub-packets as received;

means for re-sequencing the data packets as received to the original sequence according to the assigned packet identification information; and means for determining whether any of the plurality of sub-packets has associated packet identification information stored in a table using the channel identifier information, wherein the means for re-sequencing improves data throughput of the wireless communication device;

means for determining whether a received sub-packet of the plurality of sub-packets can be correctly de-coded;

if the received sub-packet can be correctly decoded, determining whether such sub-packet has a predetermined packet identification information;

if the received sub-packet cannot be correctly decoded and such sub-packet has no predetermined packet identification information, determining packet identification information for such sub-packet.

9. An apparatus for re-sequencing data packets in a wireless communication system, comprising: a memory unit;

a digital signal processing (DSP) unit communicatively coupled to the memory unit, the DSP unit being capable of:

receiving a plurality of sub-packets at a wireless communication device, the plurality of sub-packets being in a sequence different from an original sequence;

assigning channel identifier information to each of the plurality of sub-packets as received;

assigning packet identification information to each of the plurality of sub-packets as received;

re-sequencing the data packets as received to the original sequence according to the assigned packet identification information; and determining whether any of the plurality of sub-packets has associated packet identification information stored in a table using the channel identifier information, wherein the re-sequencing improves data throughput of the wireless communication device;

determining whether a received sub-packet of the plurality of sub-packets can be correctly de-coded;

if the received sub-packet can be correctly decoded, determining whether such sub-packet has a predetermined packet identification information;

if the received sub-packet cannot be correctly decoded and such sub-packet has no predetermined packet identification information, determining packet identification information for such sub-packet.

* * * * *